United States Patent [19]

Watanabe

[11] Patent Number: 5,300,311
[45] Date of Patent: * Apr. 5, 1994

[54] METHODS OF PREPARING A MODIFIED WHEAT FLOUR

[75] Inventor: Makoto Watanabe, Yamanashi, Japan

[73] Assignee: Terumo Kabushiki Kaisha, Tokyo, Japan

[*] Notice: The portion of the term of this patent subsequent to Sep. 21, 2010 has been disclaimed.

[21] Appl. No.: 858,552

[22] Filed: Mar. 27, 1992

[51] Int. Cl.$^5$ .............................................. A21D 2/16
[52] U.S. Cl. .................................... 426/622; 426/549; 426/653; 426/804
[58] Field of Search ................. 426/653, 549, 622, 804

[56] References Cited

U.S. PATENT DOCUMENTS 4,363,826  12/1982  Fukuda et al. ..................... 426/653
4,748,027   5/1988  Schou et al. ....................... 426/653

Primary Examiner—Donald E. Czaja
Assistant Examiner—Mary S. Mims
Attorney, Agent, or Firm—Frishauf, Holtz, Goodman & Woodward

[57] ABSTRACT

Methods of preparing a modified wheat flour which slows digestion and absorption of food. In the methods of this invention, 100 parts by weight of flour and 2 to 50 parts by weight of an edible amphiphilic fatty acid compound are contacted with each other in the presence of water or a solvent to permit the fatty acid compound to bind the starch in the flour, without gelatinizing the starch.

19 Claims, No Drawings

METHODS OF PREPARING A MODIFIED WHEAT FLOUR

FIELD OF THE INVENTION

This invention relates to methods of preparing a modified wheat flour, in particular to methods of preparing a modified wheat flour that has almost the same good taste as unmodified flour.

BACKGROUND OF THE INVENTION

Today, in developed societies, people suffering with obesity are rapidly increasing because of enriched eating habits. People with high obesity indexes are two or three times more liable to diabetes, atherosclerosis, and heart diseases than those with normal weights. Diseases deeply related to obesity such as gout, complications after surgery, cholelithiasis, lumbago, and hepatic diseases are also increasing steadily. Obesity is thus becoming a serious problem from the viewpoint of health care.

Under such conditions, reduction of food intake is thought of as an effective method of preventing and curing obesity. Since reducing the amount of food, however, is very hard to continue because of a strong feeling of hunger, the following methods are usually used simultaneously.

One of them is to reduce the capacity of the stomach of patients by putting a balloon in the stomach or blocking a major part of the stomach so that a small amount of food can invoke a mechanical stretching stimulus to the stomach. However, this method is not desirable because it requires surgery, and in addition there is fear of possible side effects.

The other method is to have patients consume bulking agents such as dietary fiber substances of high viscosity, optionally mixed with other foods. This method is intended to reduce the available energy content per unit weight of foods, taking advantage of the undigestibility of such bulking agents. However, this method is not desirable because it requires intake of a large amount of such bulking agents which are not essential nutrients or cause diarrhea or constipation.

Recently, it has been suggested that foods containing carbohydrates which are slowly digestively absorbed are useful to prevent obesity, even though their avilable energy content are not reduced (Jenkins, D. J. A., et al., Am. J. Clin. Nutr. 34: MARCH 1981, pp. 362–366). This method indicates that post-prandial blood glucose and insulin secretion are reduced by the intake of such carbohydrates, and also indicates that high-amylose cornstarch (amylomaze starch) is useful as the source of such carbohydrates. However, amylomaze starch cannot be used for the main source of daily starchy foods with an effective amount, as its taste and texture are not good enough.

The present invention, therefore, provides methods preparing a modified wheat flour which is digestively absorbed slowly, has the same taste and texture as a natural flour, and is useful for the source of daily starchy foods, by the modification of the flour under the presence of fatty acid compounds without gelatinization.

Further, a method is disclosed in Japanese patent application publication gazette No. 13177/1984. The object of this method is not to slow the digestion or absorption, but to improve the drawability of bread dough and prevents its aging.

Binding of starch and a fatty acid ester are also known, but are suggested for heat-reversible binding between a fatty acid ester and amylose gelatinized by heating, which produce modified starches of bad texture and of completely different characters than natural starches.

Moreover, modified flours for use as a material of various starchy foods are desired to be dried for easiness of processing. However, it takes a long time to dry flours with a high water content without causing gelatinization of the starch in the flours, as starch can readily gelatinize by heating during the drying process.

SUMMARY OF THE INVENTION

An object of the present invention is to provide methods of preparing a modified wheat flour, not gelatinized and bound by an adequate quantity of the fatty acid compound, which has the same taste as unmodified wheat flour and does not deteriorate the taste of foods made of it, is adequately slow with respect of digestive absorption and has the effects of preventing and curing obesity, and reduces the rise of post-prandial blood glucose and is suited for diabetic patients.

Another object of the present invention is to provide efficient methods of preparing such a modified wheat flour dried to a desired moisture content.

The above objects are attained by the following methods of the present invention.

In the first method of the present invention 100 parts by weight of wheat flour and 2 to 50 parts by weight of an edible amphiphilic fatty acid compound are contacted with each other at a temperature in the range of 0° to 40° C. in the presence of water to let the fatty acid bind starch in the wheat flour.

In the second method of the present invention 100 parts by weight of wheat flour and 2 to 50 parts by weight of an edible amphiphilic fatty acid compound are contacted with each other in the presence of water to let the fatty acid bind starch in the wheat flour without gelatinizing the starch, reduces the water content of the wheat flour to or below 30% before drying when the water content is above 30%, and dries the wheat flour at a temperature in the range of 40° to 300° C.

In the third method of the present invention 100 parts by weight of wheat flour and 2 to 50 parts by weight of an edible amphiphilic fatty acid compound are contacted with each other in the presence of a solvent to let the fatty acid bind starch in the wheat flour without gelatinizing the starch, and dries the wheat flour at a temperature below 40° C.

DETAILED DESCRIPTION OF THE INVENTION

The methods of present invention are described below in detail.

In the first method of the present invention 100 parts by weight of wheat flour and 2 to 50 parts by weight of an edible amphiphilic fatty acid compound are contacted with each other at a temperature in the range of 0° to 40° C. in the presence of water to let the fatty acid bind starch in the wheat flour.

For the flour used as the material, flour with a particle size about 0.1 to 100 μm is preferable, since an adequate quantity of a fatty acid compound binds the flour, and gelatinization of the flour is substantially prevented.

The material flour is contacted with an edible amphiphilic fatty acid compound in the presence of water. This can be carried out, for example, by dissolving or dispersing the fatty acid compound in water beforehand and then adding it to the flour. The quantity of the water is preferably 10 to 10,000 parts by weight to 100 parts by weight of flour, though it varies depending to the fatty acid compound used.

Practically, the fatty acid compound is added to water and the solution is stirred well; the flour is then put into the solution when the quantity of water is 100 parts by weight or greater, or the solution is added to the flour when the quantity of water smaller than 100 parts by weight; and the flour is kneaded well.

Next, the flour is maintained at a temperature in the range of 0° to 40° C. to let the fatty acid bind the flour. The length of the time to maintain the flour at said temperature is preferably 6 to 120 minutes, though it varies depending on the temperature. By carrying out the modifying agent-binding process at a temperature in the range of 0° to 40° C. it is possible to modify the starch in the flour without causing the starch to gelatinize.

The thus-obtained flour may be subjected to a drying process such as freeze drying, reduced pressure drying, or air drying to remove the remaining water as necessary.

The material flour may also be contacted with a fatty acid compound in the presence of water by dispersing the flour in water beforehand and then adding the solution of the fatty acid compound to the flour, or by putting the flour and the fatty acid compound together into water.

For the fatty acid constituent of the edible amphiphilic fatty acid compound used, those with 8 to 22 carbons, such as caprylic acid, pelargon acid, capric acid, undecyl acid, lauric acid, tridecyl acid, myristic acid, pentadecyl acid, palmitic acid, heptadecyl acid, stearic acid, nanodecanoic acid, arachic acid, behenic acid, undecylen acid, oleic acid, elaidic acid, cetoleic acid, erucic acid, brasilin acid, linolic acid, linolenic acid, and arachidonic acid are preferable.

For the edible amphiphilic fatty acid compound, sodium salts, potassium salts, and magnesium salts of these fatty acids are also usable, and esters of fatty acids are preferable.

Preferably alcohol donors for forming esters with the above fatty acids are glycerol, propylene glycol and polypropylene glycol, saccharides (sucrose, maltose, etc.), sugar alcohol (sorbitol, mannitol, erythritol, etc.), and glycerophosphoric acid. Specific edible amphiphilic fatty acid compounds include for example, glycerol fatty acid esters such as decaglycerol monolaurate, decaglycerol monomyristate, hexaglycerol monostearate, decaglycerol monostearate, monoglycerol monostearate, decaglycerol distearate, decaglycerol tristearate, decaglycerol monooleate, decaglycerol trioleate, hexaglycerol monooleate or decaglycerol pentaoleate, sucrose fatty acid esters such as sucrose stearate, sucrose palmitate, sucrose oleate, sucrose laurate or sucrose behenate, sorbitol fatty acid esters such as sorbitol monolaurate, sorbitol monostearate or sorbitol monooleate, and phospholipids such as lecithin or lysolecithin. These fatty acid esters may have a HLB (Hydrophilic Lipophilic Balance) value in any range.

The edible amphiphilic fatty acid compound in considered to bind the amylose portion of the starch in the flour. The amylose bound by the fatty acid compound takes a form in which formation of a complex with enzymes is incomplete, and hence the starch does not easily hydrolyzed by enzymes such as amylase, thus slowing the digestion and absorption.

The quantity of the edible amphiphilic fatty acid compound added is preferably 5 to 20 parts by weight to 100 parts by weight of the flour.

The proportion of the amylose of the starch in the flour occupied by the fatty acid compound is preferably equal to or greater than 10% and more preferably 40 to 95%, though it varies depending on the type of fatty acid compound used and the conditions under which the flour and the fatty acid compound are put in contact with each other. If the proportion of the occupied amylose is equal to or greater than 10%, the digestion and absorption of the starch become adequately slow.

Here "the proportion of the amylose of starch occupied by a fatty acid compound" is a value calculated from the iodine affinity (the quantity of amylose-iodine binding) measured by amperometric titration. Iodine affinity is usually used for estimating amylose content because of the amylose's property of binding iodine to form a complex. For starch in the modified flour obtained by the methods of the present invention, the iodine affinity becomes smaller than that of unmodified starch by the quantity of the amylose occupied with the fatty acid compound, because iodine does not bind the amylose occupied with by the fatty acid compound. Thus, the proportion of the amylose occupied with the fatty acid compound is calculated in terms of percentage by substracting the iodine affinity of the modified starch from that of unmodified starch, dividing the remainder by the iodine affinity of unmodified starch, and multiplying the quotient by 100.

$$\frac{\left[\begin{array}{c}\text{Iodine affinity of}\\ \text{unmodified starch}\end{array}\right] - \left[\begin{array}{c}\text{Iodine affinity of}\\ \text{modified starch}\end{array}\right]}{\text{Iodine affinity of unmodified starch}} \times 100$$

Next described is the second method of present invention.

In the second method of the present invention 100 parts by weight of wheat flour and 2 to 50 parts by weight of an edible amphiphilic fatty acid compound are contacted with each other on the presence of water to let the fatty acid bind starch in the flour without gelatinizing the starch, reduces the water content of the flour to or below 30% before drying when the water content is above 30%, and dries the flour at a temperature in the range of 40° to 300° C.

For the flour used as the material, flour with particle size about 0.1 to 100 μm is preferable, since an adequate quantity of a fatty acid compound bind the flour and gelatinization of the flour is substantially prevented.

The material flour is contacted with an edible amphiphilic fatty acid compound as described later in the presence of water. This can be carried out, for example, by dissolving or dispersing the fatty acid compound in water beforehand and then adding it to the flour. The quantity of the water is preferably 10 to 10,000 and more preferably 20 to 500 parts by weight to 100 parts by weight of flour, though it varies depending on the fatty acid compound used.

Practically, the fatty acid compound is added to water and the solution is stirred well, the flour is put in the solution when the quantity of the water is equal to or greater than 100 parts by weight, or the solution is added to the flour when the quantity of the water smaller than 100 parts by weight, and the flour is kneaded well.

The material flour may also be contacted with a fatty acid compound in the presence of water by dispersing the flour in water beforehand and then adding the fatty acid compound to the flour, or by putting the flour and the fatty acid compound together into water.

The flour is maintained preferably at a temperature in the range of 0° to 40° C. to let the fatty acid compound bind the starch in the flour. The length of the time to said temperature preferably about 5 to 120 minutes. By carrying out this modifying agent-binding process at a temperature in the range of 0° to 40° C., the flour is modified without gelatinizing.

The flour is then subjected to a water-extracting process to reduce the remaining water content to or below 30%, preferably 15%. This water-extracting process is not necessary when the water content of the flour from the modifying agent-binding process is equal to or smaller than 30%. For this water-extracting process, centrifuging by a centrifugal separator (at 100 to 10,000 rpm for 5 to 30 minutes), pressing out by a filter press, and freeze concentration can be used.

After the water content has been reduced to or below 30%, the flour is subjected to a drying process. For this process, drying methods such as reduced pressure drying (or vacuum drying), fluid bed drying, hot air drying, and warm air drying can be used, and reduced pressure drying (or vacuum drying), fluid bed drying, and hot air drying are preferable.

By thus drying the flour with the fatty acid compound bound after having reduced the water content to or below 30%, it becomes possible to dry the flour without causing the starch in the flour to gelatinize. The drying temperature is in the range of 40 to 300° C. If the temperature is below 40° C., the efficiency of the drying process is too low and it takes a long time to dry the flour; if it is above 300° C., the starch in the flour can burned to alter it into caramel.

For the edible amphiphilic fatty acid compound, the same substances as those usable for the first method can be used.

The edible amphiphilic fatty acid compound added is considered to bind the amylose portion of the starch in the flour. The amylose bound by fatty acid compound takes a form in which formation of a complex with enzymes is difficult, and the starch does not easily receive the action of enzymes such as amylase, thus becoming slow with respect of digestion and absorption.

The quantity of the edible amphiphilic fatty acid compound added is preferably 2 to 10 parts by weight to 100 parts by weight of the flour.

The proportion of the amylose of the starch in the flour bound by the fatty acid compound is preferably equal to or greater than 10% and more preferably 40 to 95%, though it varies depending on the type of fatty acid compound used and the conditions under which the flour and the fatty acid compound are put in contact with each other. If the proportion of the occupied amylose is equal to or greater than 10%, the digestion and absorption of the starch become adequately slow.

Next described is the third method of the present invention.

In the third method of the present invention 100 parts by weight of wheat flour and 2 to 50 parts by weight of an edible amphiphilic fatty acid compound are contacted with each other under the presence of a solvent to let the fatty acid bind the starch in the flour without gelatinizing the starch, and dries the flour at a temperature below 40° C.

For the flour used as the material, flour with particle size about 0.1 to 100 μm is preferable, since an adequate quantity of a fatty acid compound bind the flour, and gelatinization of the flour is substantially prevented.

The material flour is contacted with an edible amphiphilic fatty acid compound under the presence of a solvent. This can be carried out, for example, by dissolving or dispersing the fatty acid compound in a solvent beforehand and then adding the solution to the flour. The quantity of the solvent added is preferably 10 to 10,000 and more preferably 20 to 500 parts by weight to 100 parts by weight of flour, though it varies depending to the fatty acid compound and the solvent used.

In practice, the fatty acid compound is added to a solvent and the solution is stirred well; then the flour is put in the solution when the quantity of the solvent is equal to or greater than 100 parts by weight, or the solution is added to the flour when the quantity of the solvent smaller than 100 parts by weight; and the flour is kneaded well.

The material flour may also be put in contact with a fatty acid compound under the presence of a solvent by dispersing the flour in the solvent beforehand and then adding the fatty acid compound to the flour, or by putting the flour and the fatty acid compound together into the solvent.

The solvent is used in order to put the flour and the fatty acid compound into contact with each other evenly and effectively, and therefore hydrophilic solvents which can readily wet the flour and disperse an amphiphilic fatty acid compound uniformly are desirable. Specifically, water, alcohol, glycerol, alkylene glycol, acetone, or a mixture of two or more of them can be used, for example, and appropriate one is chosen according to the properties of the amphiphilic fatty acid compound used.

The flour is maintained preferably at a temperature in the range of 0° to 40° C. The length of the time to maintain is preferably 1 to 60 minutes. By carrying out this modifying-agent binding process in the temperature range of 0° to 40° C., the flour is modified without gelatinizing.

The flour is subjected to a drying process. For this process, drying methods such as freeze drying, reduced pressure drying (or vacuum drying), fluid bed drying, warm air drying, and air drying can be used, and freeze drying, reduced pressure drying, and fluid bed drying are preferable.

The drying temperature is below 40° C. By drying the flour at a temperature in the range below 40° C., the flour can be dried without gelatinizing.

For the edible amphiphilic fatty acid compound, the same substances as for the first method can be used.

The edible amphiphilic fatty acid compound added is considered to bind the amylose portion of the starch in flour. The amylose bound by fatty acid compound takes a form in which formation of a complex with enzymes is difficult, and hence the starch does not easily receive the action of enzymes such as amylase, thus slowing the digestion and absorption.

The quantity of the edible amphiphilic fatty acid compound added is preferably 2 to 10 parts by weight to 100 parts by weight of flour.

The proportion of the amylose of the starch in flour bound by the fatty acid compound is preferably equal to or greater than 10% and more preferably 40 to 95%, though it varies depending on the type of fatty acid compound used and the conditions under which the flour and the fatty acid compound are put in contact with each other. If the proportion of the occupied amylose is equal to or greater than 10%, the digestion and absorption of the starch become adequately slow.

EXAMPLES

Hereinafter described are examples of the present invention.

EXAMPLE 1

2.5 g of glycerol monostearate (EMULGE-MS, Riken Vitamins K.K.) was dispersed in 5 l water. Next, 50 g of commercially available wheat flour was put in the water and maintained at 30° C. for 60 minutes. The flour was then freeze-dried and ground. Thus a modified flour (sample 1) was obtained.

EXAMPLE 2

A modified flour (sample 2) was prepared by the same process as that of example 1 except that sucrose stearate (S-1570, Mitsubishi Chemical Industries, Ltd.) was used in place of glycerol monostearate.

EXAMPLE 3

A modified flour (sample 3) was prepared by the same process as that of example 1 except that the flour was maintained at 40° C.

Control 1

A modified flour (sample 4) was prepared by the same process as that of example 1 except that the flour was maintained at 65° C.

Control 2

A modified flour (sample 5) was prepared by the same process as that of example 1 except that the flour was maintained for 5 minutes.

Control Example 3

A modified flour (sample 6) was prepared by the same process as that of example 1 except that the flour was maintained at 50° C.

EXAMPLE 4

2 g of sucrose stearate (S-1570, Mitsubishi Chemical Industries, Ltd.) was dispersed in 3 l water. This solution was added to 100 g of commercially available wheat flour. The flour was maintained at 30° C. for 60 minutes. Next, the flour was centrifuged at 10,000 rpm for 10 minutes and the supernatant was removed to reduce the water content to 25%. The flour was then vacuum-dried at 70° C. for 60 minutes to a moisture content of 0.1%. The dried flour was ground to average particle size 0.1 mm. Thus a modified flour (sample 13) was obtained.

EXAMPLE 5

2.5 g of glycerol monostearate (EMULGE-MS) and 14 ml water were added to 50 g of commercially available flour, and the flour was kneaded at 30° C. for 60 minutes. The kneaded flour (water content 28%) was dried using a fluid bed drier at 80° C. for 60 minutes to a moisture content of 4.5%. The dried flour was ground to average particle size 0.1 mm. Thus a modified flour (sample 14) was obtained.

EXAMPLE 6

1 kg of commercially available flour and 20 g of sorbitol laurate (EMASOL L-10, Kao Soap Co. Ltd.) were put in 3 l water together. The flour was maintained at 30° C. for 90 minutes with stirring. This flour was then centrifuged at 10,000 rpm for 10 minutes and the supernatant was removed to reduce the water content to 26%. The flour was then heat-dried using a drum drier at 250° C. (average drying time 1 minute) to a moisture content of 2.5%. The dried flour was ground to average particle size 0.1 mm. Thus a modified flour (sample 15) was obtained.

EXAMPLE 7

10 kg of commercially available flour and 200 g glycerol monostearate were uniformly mixed. The mixture was next put in a continuous kneader and kneaded with pressure 2 kg/cm2 for 1 minute, adding water 150 ml per kg of the mixture. The water content of this kneaded flour was 15%. The kneaded flour was dried using a shelf-type drier at 120° C. for 30 minutes to a moisture content of 4.8%. This dried flour was ground to average particle size 0.1 mm. Thus modified flour (sample 16) was obtained.

Control 4

2 g of sucrose stearate (S-1570) was dispersed in 3 l water. Next, this solution was added to 100 g of commercially available flour and the flour was maintained at 30° C. for 60 minutes. This flour was then air-dried at 30° C. so as not to gelatinize the flour. It took 24 hours to reduce the moisture content to 3.0%.

Control 5

A modified flour (sample 17) was prepared by the same process as that of example 4 except that the flour was not subjected to the centrifugal water extraction.

Control 6

1 kg of flour bought on the market and 20 g of sorbitol laurate (EMASOL L-10) were put in 3 l water together. The flour was maintained at 30° C. for 90 minutes with stirring. This flour was then dried by a shelf type drier at 60° C. for 2 hours to a moisture content of 4.9%. This dried flour was ground to average particle diameter 0.1 mm. Thus a modified flour (sample 18) was obtained.

EXAMPLE 8

25 g of sucrose stearate (S-1570) was dispersed in 3 l water. 1 kg of commercially available flour was put into this solution, and the flour was maintained at 30° C. for 60 minutes. Next, this flour was dried by reduced pressure drying at 30° C. for 6 hours to a moisture content of 1.8%. This dried flour was ground to average particle size 0.1 mm. Thus a modified flour (sample 25) was obtained.

EXAMPLE 9

2.5 g of glycerol monostearate (EMULGE-MS) and 15 ml water were added to 50 g of commercially available flour. The flour was kneaded at 30° C. for 60 minutes. The kneaded flour was then freeze-dried at −20° C. for 12 hours to a moisture content of 0.1%. This flour was ground to average particle size 0.1 mm. Thus a modified flour (sample 26) was obtained.

Control 7

A modified flour (sample 27) was prepared by the same process as that of example 8 except that the flour was dried using a spray drier at 50° C. (average drying time 1 minute).

Control 8

A modified flour (sample 28) was prepared by the same process as that of example 8 except that the flour was dried using a spray drier at 60° C. (average drying time 1 minute).

Control 9

A modified flour (sample 29) was prepared by the same process as that of example 8 except that the flour was dried using a spray drier at 80° C. (average drying time 1 minute).

Control 10

A modified flour (sample 30) was prepared by the same process as that of example 8 except that the flour was dried using a spray drier at 200° C. (average drying time 1 minute).

Experiment 1

The gelatinization starting temperature, digestive efficiency by Porcine Pancreatic Amylase (PPA), and proportion of the occupied amylose of the modified flours of samples 1 to 6, 13 to 18 and 25 to 30 were measured, and the results of the measurements were shown in Table 1.

The gelatinization starting temperature was measured by the following method. Samples of 0.1 g were taken from the above samples. Purified water was added to each sample to increase the total volume to 100 ml. The sample was then put in a cell of a photopastegraphy and so heated that the temperature rose at a rising rate of 2° C. per minute with stirring. While the temperature is rising, the absorbance for 372 nm light was continuously measured until 95° C. The temperature corresponding to the inflection point in the variation of the absorbance was regarded as the gelatinization starting temperature.

The digestive efficiency by PPA was measured by the following method. Unmodified flour of 0.5 g and the same quantity of modified flours taken from the above samples were subjected to the measurement. 49 ml of 50 mM phosphate buffer solution (pH 6.9) was added to each sample, and the sample was incubated for 30 minutes in a shaking incubator the temperature of which was maintained at 37° C. 1 ml of enzyme preparation by diluting PPA (α-amylase from porcine pancreas, Sigma Inc.) to 50 μU/ml with a phosphate buffer solution was added to the sample solution to make the enzyme act on the sample. At 0, 20, 40, and 60 minutes after the reaction started, the sample solution was put into two test tubes each with 3.8 ml of 0.1N sodium hydroxide put in, by 0.2 ml for each test tube, to stop the enzyme reaction. The quantity of the reducing sugar produced by PPA reaction was determined by the Somogyi-Nelson method. For this measurement, the flour in the sample preparation was gelatinized beforehand by adding phosphate buffer solution to the sample preparation and heating the sample preparation by putting the test tubes in a boiling hot-water bath for 30 minutes.

The proportion of occupied amylose was measured by the following method. 0.1 g measurement samples were taken from the above samples. 20 ml of 0.5N potassium hydroxide was added to each sample and the sample was stirred until the solid pieces completely disappeared. 150 ml distilled water and then 20 ml of 1N hydrochloric acid were added to the solution in order to neutralize the solution and to increase the total volume of the solution to 190 ml. 95 ml of the thus prepared solution was cooled, and 5 ml of 0.4N potassium iodate was added to the solution. The solution was then titrated with 0.00157N potassium iodate ($KIO_3$) at a titrating rate of 0.5 ml per minute, applying 25 mV voltage and measuring the electric current. The point at which the current began to sharply increase was regarded as the inflection point, and the titre at that point was taken as the titration value. Separately, the total quantity of sugar in 0.1 g of the same sample was measured by the phenolsulfuric acid method. Using these titration value and total quantity of sugar, the iodine affinity and the proportion of occupied amylose of each sample were calculated.

Experiment 2

Modified flours taken from the above samples 1 to 6, 13 to 18, and 25 to 30, each 50 g, were mixed with 9 g sugar, 15 g baking powder, 3 g dried whole egg, and 4 g dried milk, respectively. Further, 2.5 g butter and 60 cc water were added to each mixture and kneaded. Each dough was poured into a baking mold and baked in an oven at 190° C. for 30 minutes into a sponge cake. The sponge cake was removed from the baking mold immediately after taking out from the oven and cooled to room temperature. Thus sponge cakes (samples 7 to 12, 19 to 24, and 31 to 36) were obtained. These sponge cakes were tasted by 10 people, and assigned one of the following three grades. The results of the Experiment 2 were shown in Table 2.

TABLE 1

| | Gelatinization starting temperature (°C.) | PPA digestivity (%) | Proportion of occupied amylose (%) |
|---|---|---|---|
| Spl 1 (EX1) | 65.6 | 73.5 | 74.2 |
| Spl 2 (EX2) | 66.8 | 71.9 | 78.5 |
| Spl 3 (EX3) | 65.9 | 68.5 | 83.5 |
| Spl 4 (CO1) | — | 62.0 | 90.2 |
| Spl 5 (CO2) | — | 76.3 | 72.8 |
| Spl 6 (CO3) | — | 68.0 | 87.0 |
| Spl 13 (EX4) | 66.3 | 80.5 | 76.5 |
| Spl 14 (EX5) | 66.0 | 75.3 | 91.5 |
| Spl 15 (EX6) | 65.4 | 83.2 | 79.3 |
| Spl 16 (EX7) | 66.3 | 85.0 | 82.2 |
| Spl 17 (CO5) | — | 81.9 | 77.0 |
| Spl 18 (CO6) | — | 83.1 | 79.5 |
| Spl 25 (EX8) | 66.0 | 84.3 | 72.3 |
| Spl 26 (EX9) | 66.1 | 73.5 | 90.8 |
| Spl 27 (CO7) | — | 83.7 | 71.0 |
| Spl 28 (CO8) | — | 83.9 | 72.6 |
| Spl 29 (CO9) | — | 82.8 | 72.3 |
| Spl 30 (CO10) | — | 81.4 | 73.9 |

Note: The "—" marks in the table show that the starch was already gelatinized and the gelatinization starting temperature did not exist.

TABLE 2

| Sample No. | Taste (A/B/C) |
|---|---|
| 7(EX1) | 10/0/0 |
| 8(EX2) | 9/1/0 |
| 9(EX3) | 10/0/0 |
| 10(CO1) | 0/0/10 |
| 11(CO2) | 1/2/7 |
| 12(CO3) | 0/2/8 |
| 19(EX4) | 10/0/0 |
| 20(EX5) | 9/1/0 |
| 21(EX6) | 7/3/1 |

TABLE 2-continued

| Sample No. | Taste (A/B/C) |
|---|---|
| 22(EX7) | 9/0/1 |
| 23(CO5) | 1/2/7 |
| 24(CO6) | 0/2/8 |
| 31(EX8) | 10/0/0 |
| 32(EX9) | 9/1/0 |
| 33(CO7) | 0/9/1 |
| 34(CO8) | 0/0/10 |
| 35(CO9) | 1/2/7 |
| 36(CO10) | 0/2/8 |

A: Good
B: Slightly moist but rather good
C: Gelatinous and bad

Sponge cakes of samples 7 to 12, 19 to 24 and 31 to 36 were freeze-dried, ground to average particle size 100μ, and heated in a boiling hot-water bath for 30 minutes to completely gelatinize. Then, their digestive efficiency by PPA and proportion of occupied amylose were measured by the same methods as in the experiment 1. The results were almost the same as those measured in experiment 1 and shown in Table 1.

It is known from the results shown in Tables 2 and 1 that the sponge cakes of samples 7 to 9 and 19 to 22 made of the modified flours prepared by the methods of the present invention taste good and are significantly slow with respect of digestion and absorption; whereas those of comparative samples 10 to 12, 23, and 24 are also slow with respect of digestion and absorption, but considerably inferior in taste.

The first method of the present invention puts 100 parts by weight of wheat flour and 2 to 50 parts by weight of an edible amphiphilic fatty acid compound in contact with each other at a temperature in the range of 0° to 40° C. in the presence of water to let the fatty acid compound bind starch in the wheat flour. The modified wheat flour prepared by this method therefore has the same taste as unmodified flour and does not deteriorate the taste of foods made of it; is adequately slow of digestion and absorption and has the effects of preventing and curing obesity; and does not cause a rise of post-prandial blood glucouse and is suited for diabetic patients. Accordingly, foods made of this modified flour are slow of digestion and absorption, and have the same taste as those made of unmodified flour.

The second method of the present invention puts 100 parts by weight of wheat flour and 2 to 50 parts by weight of an edible amphiphilic fatty acid compound in contact with each other under the presence of water to let the fatty acid compound bind the starch in the flour without gelatinizing the starch, extracts the water content of the flour to or below 30% before drying when the water content is above 30%, and dries the flour at a temperature in the range of 40 to 300° C. By this method, a dry modified flour not gelatinized and bound by an adequate quantity of the fatty acid compound can be obtained. Particularly, since the water content of the flour modified is reduced to or below 30% before drying and then the modified flour is dried at a temperature in the range of 40° to 300° C., the modified flour can be dried to a desired moisture content in a comparatively short time without causing gelatinization of the starch in the flour. The modified flour prepared by this method also has the same taste as unmodified flour and does not deteriorate the taste of foods made of it; is adequately slow with respect of digestion and absorption and has the effects of preventing and curing obesity; and does not cause a rise of post-prandial blood glucouse and is suited for diabetic patients. In addition, it is easy to use as a material for various foods. Accordingly, foods made of this modified flour are slow with respect of digestion and absorption, and have the same taste as those made of unmodified flour.

The third method puts 100 parts by weight of wheat flour and 2 to 50 parts by weight of an edible amphiphilic fatty acid compound in contact with each other under the presence of a solvent to let the fatty acid compound bind starch in the flour without gelatinizing the starch, and dries the modified flour at a temperature below 40° C. By this method as the second method, a dry modified flour not gelatinized and bound by an adequate amount of the fatty acid compound can be obtained. Particularly, by using a proper solvent, it becomes possible to let a larger quantity of a fatty acid compound bind the starch in flour without gelatinizing the flour, and to dry the modified flour quickly at a lower temperature below 40° C. Further, by drying the modified flour at the lower temperature, the modified flour can be dried without gelatinizing. The modified flour prepared by this method also has the same taste as unmodified flour and does not deteriorate the taste of foods made of it; is adequately slow with respect of digestion and absorption and has the effects of preventing and curing obesity; and does not cause a rise of post-prandial blood sugar and is suited for diabetic patients. In addition, it is easy to use as a material for various foods. Accordingly, foods made of this modified flour are slow with respect of digestion and absorption, and have the same taste as those made of unmodified flour.

What is claimed is:

1. A method of preparing a modified wheat flour comprising contacting 100 parts by weight of wheat flour and 2 to 50 parts by weight of an edible amphiphilic fatty acid compound with each other at a temperature of 0° to 40° C. in the presence of water to let the fatty acid compound bind starch in the wheat flour.

2. The method of preparing a modified wheat flour of claim 1, wherein said wheat flour and said fatty acid compound are contacted with each other in the presence 10 to 10,000 parts by weight of water to 100 parts by weight of said wheat flour.

3. The method of preparing a modified wheat flour of claim 1, wherein said edible amphiphilic fatty acid compound is selected from the group consisting of glycerol-fatty acid esters, sucrose-fatty acid esters, sorbitan-fatty acid esters and phosphatides.

4. A method of preparing a modified wheat flour comprising contacting 100 parts by weight of wheat flour and 2 to 50 parts by weight of an edible amphiphilic fatty acid compound with each other in the presence of water to let the fatty acid compound bind starch in the wheat flour, without gelatinizing the starch, the water content of the wheat flour is reduced to or below 30% before drying when the water content is above 30%, and the wheat flour is dried at a temperature of 40° to 300° C.

5. The method of preparing a modified wheat flour of claim 4, wherein said wheat flour and said fatty acid compound are contacted with each other in the presence of 10 to 10,000 parts by weight of water to 100 parts by weight of said wheat flour.

6. The method of preparing a modified wheat flour of claim 4, wherein said wheat flour is ground to a powder after being dried.

7. The method of preparing a modified wheat flour of claim 4, wherein said drying of wheat flour is carried out by reduced pressure or vacuum drying, fluid bed drying, or hot air drying.

8. The method of preparing a modified wheat flour of claim 4, wherein said edible amphiphilic fatty acid is selected from the group consisting of glycerol-fatty acid esters, sucrose-fatty acid esters, sorbitan-fatty acid esters and phosphatides.

9. A method of preparing a modified wheat flour comprising contacting 100 parts by weight of wheat flour and 2 to 50 parts by weight of an edible amphiphilic fatty acid compound with each other in the presence of a solvent to let the fatty acid compound bind starch in the wheat flour, without gelatinzing the starch, and the wheat flour is dried at a temperature below 40° C.

10. The method of preparing a modified wheat flour of claim 9, wherein the quantity of said solvent is 10 to 10,000 parts by weight to 100 parts by weight of what flour.

11. The method of preparing a modified wheat flour of claim 9, wherein said wheat flour is ground to a powder after being dried.

12. The method of preparing a modified wheat flour of claim 9, wherein said drying of wheat flour is carried out by reduced pressure or vacuum drying, freeze drying, or fluid bed drying.

13. The method of preparing a modified wheat flour of claim 9, wherein said edible amphiphilic fatty acid is selected from the group consisting of glycerol-fatty acid esters, sucrose-fatty acid esters, sorbitan-fatty acid esters and phosphatides.

14. The method of preparing a modified wheat flour of claim 2, wherein the flour has a particle size of 0.1 to 100 μm; said edible amphiphilic fatty acid compound is selected from the group consisting of a glycerol-fatty acid ester, a sucrose-fatty acid ester, a sorbitan-fatty acid ester and a phosphatide; and the proportion of amylose in the flour bound by the fatty acid compound is 40 to 95%.

15. The method of preparing a modified wheat flour of claim 5, wherein the flour has a particle size of 0.1 to 100 μm; said edible amphiphilic fatty acid compound is selected from the group consisting of a glycerol-fatty acid ester, a sucrose-fatty acid ester, a sorbitan-fatty acid ester and a phosphatide; and the proportion of amylose in the flour bound by the fatty acid compound is 40 to 95%.

16. The method of preparing a modified wheat flour of claim 15, wherein the water is in an amount of 20 to 500 parts by weight to 100 parts by weight of said wheat flour; the contacting is carried out at a temperature of 0° to 40° C. for 5 to 120 minutes; and the proportion of amylose in the flour bound by the fatty acid compound is 40 to 95%.

17. The method of preparing a modified wheat flour of claim 16, wherein the water content is reduced to 15%.

18. The method of preparing a modified wheat flour of claim 10, wherein the flour has a particle size of 0.1 to 100 μm; said edible amphiphilic fatty acid compound is selected from the group consisting of a glycerol-fatty acid ester, a sucrose-fatty acid ester, a sorbitan-fatty acid ester and a phosphatide; and the proportion of amylose in the flour bound by the fatty acid compound is 40 to 95%.

19. The method of preparing a modified wheat flour of claim 18, wherein the solvent is in an amount of 20 to 500 parts by weight to 100 parts by weight of flour; the solvent is selected from the group consisting of alcohol, glycerol, alkylene glycol, acetone and a mixture thereof; the contacting is carried out at a temperature of 0° to 40° C. for 1 to 60 minutes; and the proportion of amylose of the starch in the flour bound by the fatty acid compound is 40 to 95%.

* * * * *